J. D. BETTS.
COOKING AND HEATING VESSEL.
APPLICATION FILED JAN. 29, 1910. RENEWED JULY 27, 1912.
1,050,095.  Patented Jan. 14, 1913.
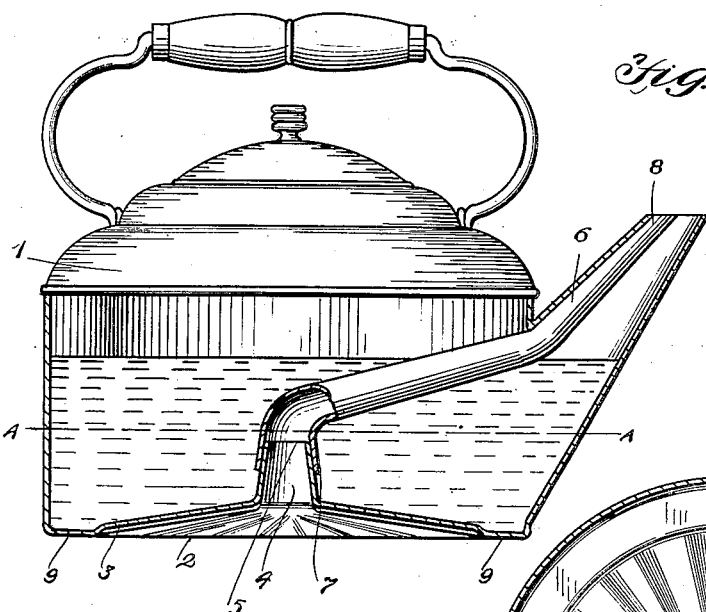
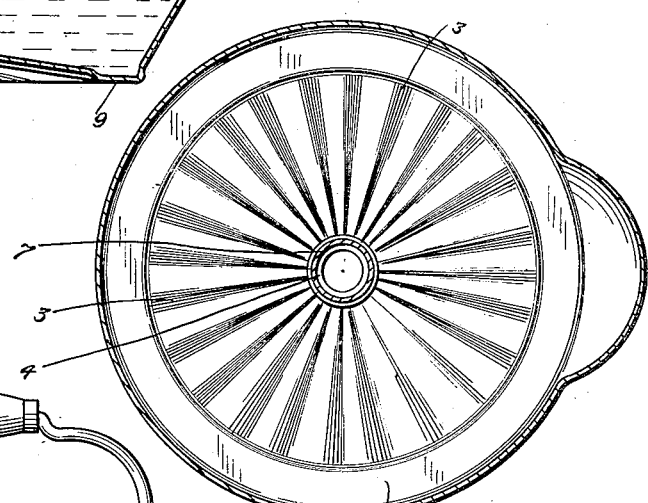
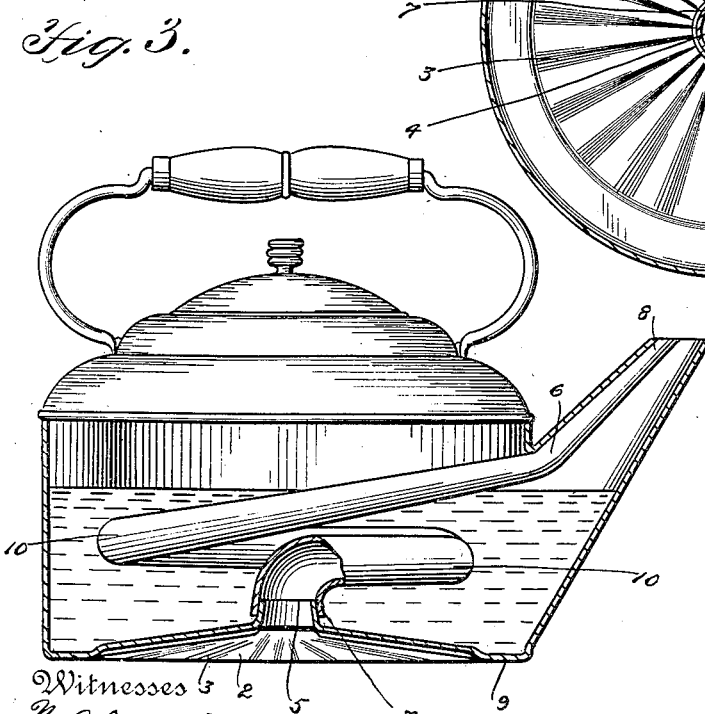
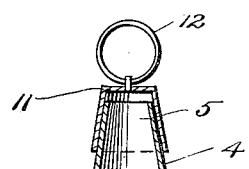
Witnesses
N. Abramson
Lila M. Gillespie
Inventor
John D. Betts
Alex. J. Cadderoun, Jr.
Attorney

UNITED STATES PATENT OFFICE.

JOHN D. BETTS, OF CHICAGO, ILLINOIS.

COOKING AND HEATING VESSEL.

1,050,095.  Specification of Letters Patent.  Patented Jan. 14, 1913.

Application filed January 29, 1910, Serial No. 540,840. Renewed July 27, 1912. Serial No. 711,916.

*To all whom it may concern:*

Be it known that I, JOHN D. BETTS, a citizen of the United States, residing at Chicago, in the county of Cook and State of Illinois, have invented certain new and useful Improvements in Cooking and Heating Vessels, of which the following is a specification.

This invention relates to cooking and heating vessels and more particularly to that class of vessels having a spout thereon.

One of the objects of my invention is to provide a teakettle by means of which the liquid contents may be brought to the boiling point in the shortest possible time.

Another object of the invention is to use the least amount of fuel in heating the contents of the kettle.

With the above and other objects in view the invention consists in the arrangement of parts to be hereinafter fully described in the following specification, illustrated in the accompanying drawings and pointed out in the claim, which forms a part of this specification.

The drawings embodied in this application are for the purpose of illustration only, and it is understood that my invention may be used in other vessels of a similar character, and that a spout to the vessel is not an essential as the upper end of the heating pipe may terminate at or near any opening in a vessel.

In the drawings, Figure 1 is a side elevation partly in section showing a flattened circumferential portion, Fig. 2 is a section taken on line A—A of Fig. 1, and Fig. 3 is a view similar to Fig. 1 showing a coiled pipe. Fig. 4 is an apex in which the bottom terminates, showing a cap thereon.

Like numerals of reference indicate like parts throughout the several views.

1 indicates a teakettle, the bottom 2 of which is concave in form and fluted as indicated at 3. The bottom terminates in a tapering apex 4, the top of which is open as shown at 5. 6 is a heating pipe, one end of which is adapted to fit closely over said apex as shown at 7, the other end of said heating pipe being at the mouth of the kettle as shown at 8 or at any other opening in the vessel.

9 indicates a flattened surface around the outer circumference of the bottom 2, this flattened surface acts as a bearing for the kettle against a stove.

10 shows a spiral form in which the heating pipe may be made if desired.

If desired the heating pipe may be removed and the cap 11 may be used to close the opening in the apex, this cap being made tapering so as to form a water tight closure. A ring or handle 12 is secured thereto in order to facilitate the removal of same.

The concave fluted bottom of my improved vessel greatly adds to the heating surface of same and the addition of a heating pipe permits of a draft which draws the heat to the vessel and causes it to pass through the liquid thus further increasing the heating surface. The heating pipe may be made sufficiently long to allow of a number of turns therein before its end terminates at the opening if desired, as indicated at 10, Fig. 3.

From actual experience it has been found that water can be brought to a boiling point in just one-third of the time required by other vessels, thus not only saving time but two-thirds of the fuel.

Various changes and modifications may be made in this device without departing from the spirit of my invention.

Having described my invention, I claim and desire to secure by Letters Patent:—

A tea kettle having its bottom fluted and formed concave, said bottom having a peripheral flattened portion said bottom terminating in an apex with an opening therein, said apex being tapered, a curved heating pipe having one end tapered to conform to the taper of said apex and adapted to fit closely thereover to form a water tight connection, the free end of the heating pipe terminating at the mouth of the spout of said kettle, said heating pipe being removably secured to said apex and a cap forming a closure for said apex when said heating pipe is removed.

In testimony whereof I affix my signature in presence of two witnesses.

JOHN D. BETTS.

Witnesses:
H. BUCHANAN,
JULIUS SPANIER.